United States Patent [19]

Sollich

[11] Patent Number: 5,044,267

[45] Date of Patent: Sep. 3, 1991

[54] TUNNEL FOR COOLING, HEATING, OR DRYING PRODUCTS OF THE FOODSTUFFS AND ESPECIALLY CONFECTIONERY INDUSTRIES

[75] Inventor: Helmut Sollich, Rabenkirchen, Fed. Rep. of Germany

[73] Assignee: Sollich GmbH & Co. KG, Bad-Salzuflen, Fed. Rep. of Germany

[21] Appl. No.: 514,260

[22] Filed: Apr. 25, 1990

[30] Foreign Application Priority Data

Apr. 28, 1989 [DE] Fed. Rep. of Germany ....... 3914098

[51] Int. Cl.$^5$ .............................................. A23L 3/00
[52] U.S. Cl. ....................................... 99/483; 34/201; 34/236; 62/373; 62/380; 99/443 C; 99/467
[58] Field of Search ................ 99/483, 467, 516, 517, 99/443 R, 443 C, 474, 482, 477–479, 386; 432/128, 152, 158, 153; 126/19 R, 21 R; 219/400, 388; 34/201, 236; 62/380, 374

[56] References Cited

U.S. PATENT DOCUMENTS

| | | | |
|---|---|---|---|
| 3,695,170 | 10/1972 | Ehrenberg | 99/443 C |
| 3,910,176 | 10/1975 | Burrows | 99/477 |
| 4,245,613 | 1/1981 | Wells et al. | 126/19 R |
| 4,366,177 | 12/1982 | Wells et al. | 219/388 |
| 4,448,117 | 5/1984 | Wells | 432/152 |
| 4,532,857 | 8/1985 | Sollich | 99/483 |
| 4,701,340 | 10/1987 | Bratton et al. | 126/21 A |
| 4,716,820 | 1/1988 | Stuck | 99/443 C |
| 4,887,524 | 12/1989 | Ellis-Brown | 99/467 |

Primary Examiner—Timothy F. Simone
Attorney, Agent, or Firm—Max Fogiel

[57] ABSTRACT

A tunnel for cooling, heating, or drying products of the foodstuffs and especially confectionery industries. The tunnel has a base, especially one comprising several adjacent segments (4), a series of self-supporting hoods (5) that have a cross-section in the form of an inverted U and are made of rigid expanded plastic, tracks (9) between the edges of the base (2) and the walls (7) of the hoods to create a seal, and a belt (21) to convey the products (22) longitudinally through the interior (10) of the tunnel. Take-apart hinges (13 or 26) are positioned between the edges of the base and the walls of the hoods on each side of the tunnel.

10 Claims, 3 Drawing Sheets

TUNNEL FOR COOLING, HEATING, OR DRYING PRODUCTS OF THE FOODSTUFFS AND ESPECIALLY CONFECTIONERY INDUSTRIES

BACKGROUND OF THE INVENTION

The invention concerns a tunnel for cooling, heating, or drying products of the foodstuffs and especially confectionery industries, with a base, especially one comprising several adjacent segments, with a series of self-supporting hoods that have a cross-section in the form of an inverted U and are made of rigid expanded plastic, with tracks between the edges of the base and the walls of the hoods to create a seal, and with a belt to convey the products longitudinally through the interior of the tunnel. The particular interior design of the tunnel, the number and distribution of channels, that is, with air or water flowing through them, especially for cooling purposes, is of subordinate importance to the invention, which is much more concerned with the design and distribution of the walls of the tunnel, which can consist either of a continuous base or of several adjacent segments, whereby the base is covered by a series of hoods such that the interior of the tunnel is enclosed along the direction that the conveyor belt travels in.

A tunnel of this type is known from European Exposure 144 456. Since the hoods are moldings of rigid expanded plastic, especially polyurethane, they are self-supporting units that cover the base of the tunnel. For sealing purposes there is a track in the vicinities of each wall of every hood and of the base. The tracks comprise a continuous tenon on the base that fits into a matching mortise in the free edge of the wall of the hood. The track is continuous along the length of the hoods and hence over the total length of the tunnel. The track seals the tunnel off longitudinally. Transversely, a seal that extends over the U-shaped cross-section is inserted into at least each face of every hood. The hoods are forced together by longitudinal tensioning mechanisms, making the tunnel tight transversely as well by way of the inserted seals. The faces of the hoods are not covered.

The inside of any tunnel, especially a tunnel employed in the confectionery industry, must be cleaned from time to time, and it is the base and the various built-in apparatus—cooling surfaces, baffles, etc.—that the process may concern in particular. The labyrinth-like channel in the vicinity of the track also requires cleaning. This necessity occurs basically because particles of chopped nuts, puffed rice, rolled oats, etc. that have been sprinkled over the products traveling through the tunnel fall off onto the conveyor belt and accumulate inside the tunnel. The same events occur with particles that contain fat—slivers of chocolate and other constituents for example that drop off the products while they are traveling through the tunnel and even through the belt, which is often in the form of a mesh, into the tunnel. These greasy particles become rancid inside the tunnel after a while. Particles of dust entrained by the cooling air etc. can also make it necessary to clean the tunnel from time to time. Otherwise, the requisite health conditions will not exist. It may, however, also be necessary to look inside the tunnel from time to time to monitor the products and even to obtain samples. It is in any case very important for the inside of such a tunnel to be easily accessible, at least for cleaning purposes.

The tunnel known from European Exposure 144 456 has spreaders made of mutually articulated arms or brackets between each hood and its associated base. Each hood can accordingly be lifted off the base and positioned above the conveyor belt to provide access to the interior. Obviously the axial and longitudinal tension on the hoods must be released before one or more can be lifted. Since the hoods are not covered, however, each hood can to advantage be lifted independently of its adjacent hoods and maintained in the lifted position by the spreaders. The space inside the tunnel accordingly becomes accessible to advantage from each side. This bilateral accessibility is very important because such a tunnel may be as much as two meters wide and can accordingly not be effectively cleaned from one side alone. A drawback is that two operators must cooperate to lift the hoods. The distribution, design, and operation of the spreaders are also not without problems. These mechanisms are usually made of metal and must initially be mounted on the hoods, which are made from rigid expanded plastic. Metal parts are always a drawback for thermodynamic reasons in a tunnel of this type. Even the conventional anchoring of the spreaders in the plastic that the hoods are made of is not simple. For tunnels that are not very wide it is completely satisfactory for the hoods to fold up at only one side to allow access for cleaning from the opposite side. This, however, is impossible with the known hoods which can only be lifted straight. For many purposes it would also be a good idea to be able to completely remove the hoods from the base.

This as well, however, is impossible in this case without removing the spreaders.

Also known is a tunnel wherein both the segments of the base and the hoods are made of rigid expanded plastic and have no metal parts. This tunnel is also sealed tight by a track between the base segments and the hoods. The track does not extend far enough across the horizontal plane to act as a hinge. It only constitutes a labyrinth seal for the inside of the tunnel. Hence, although the hoods can be removed from the base of the tunnel, they cannot be tilted up. The removability provides satisfactory access from both sides of the tunnel as is desired for cleaning purposes. During such cleaning, however, the hoods must be accommodated somewhere, on an adjacent hood that has not been removed yet or on the floor for example. Since no metal parts are involved in this embodiment, the hoods are advantageously light in weight and their surface is unobjectionable in that it is easy to keep clean and has no angles or corners that could harbor bacteria. The walls of the tunnels are also thermodynamically optimal because there are no metal parts to short the heat. The base segments and hoods are easy to manufacture. Once they have been expanded, they need no further processing and there are no metal components to be mounted. There is a drawback to this known tunnel in that they hoods cannot be pivoted up at one side and must always be completely removed. Once they have been removed they can to a certain extent be exposed to damage.

Also known is a tunnel with hoods made at least partly of metal. The metal components can comprise a framework with plastic foamed around it to satisfy thermodynamic demands. Using enameled sheet steel for the inner and outer surface of the hood and filling the space between the surfaces with foam is also known. This type of hood does have a covering in the vicinity of the face that is useful for sealing purposes, although this is accompanied by the drawback that only every other hood can be tilted up independently of the adjacent hoods. The hoods are also provided with hinges along one side of the tunnel, in the vicinity of one arm of the U-shaped cross-section. These hoods can accordingly be pivoted up only from one side, so that, when the tunnel is wide, it can no longer be cleaned from the side where the hinge is. Furthermore, the hoods cannot be removed, which is another drawback. Since the metal parts make the hoods substantially heavier, they are harder to pivot up. Once they have been pivoted up, however, they are protected from damage. These hoods are complicated and expensive to manufacture and the hinges are difficult to mount.

SUMMARY OF THE INVENTION

The object of the invention is a tunnel of the aforesaid type with hoods made from rigid expanded plastic without any metal components that is easily accessible for cleaning from both sides. The hoods should also be easy to remove completely.

This object is attained in accordance with the invention in that take-apart hinges are positioned between the edges of the base and the walls of the hoods on each side of the tunnel. It now becomes possible for the first time and to advantage to pivot a hood up at either side of the tunnel so that each section of the inside can easily be cleaned and inspected from that side. When one side of the hood is pivoted up, the hinges on that side are disassembled and the hinges on the opposite side function as hinges and allow the pivoting motion. The same is true of the opposite situation. It is on the other hand also possible to lift both sides of the hood at once in a straight line. The hoods are advantageously light in weight in that they essentially consist only of rigid expanded plastic. If the fold-up hinges are made of metal, one half of the hinge must be secured to the hood and the other to the base. This prevents thermal shorting.

Each take-apart hinge can consist of a rib-like elevation on one half, on the base for example, and of a groove-like depression on the other half, on the wall of the hood for example. This is an especially simple hinge design that provides the additional advantage that the groove-like depression in the hood does not add to its weight. It is, however, important for the hinge to be designed so that it can not only operate reliably as a hinge but will also, when it is in its active state, secure the hood to the base and allow only a pivoting motion around its axis such that the hood will reliably remain secured to the base while it is being tilted up from it and will not drop off. It must on the other hand also be possible to easily lift the hinge up so that the hood can as desired also be pivoted up from one side or the other.

It is a particular advantage for the elevations and depressions to be integral parts of the segments of the base and of the hoods and molded into them. This considerably simplifies manufacture and makes it less expensive and advantageously makes it possible to make components of the hinge or hinges comparatively extensive. No further processing and especially mounting of metal components are necessary.

One group of hinges is characterized in that at least two take-apart hinges are locally positioned and designed separated in the longitudinal direction between each segment of the base of the tunnel and every hood on each side of the tunnel. These hinges are accordingly not longitudinally continuous but are locally designed and can be positioned in the vicinity of the track. The track must in any case be continuous. The local hinges have play in the longitudinal direction to allow the requisite thermal motions during the expansion and contraction of the component of the tunnel and to permit the hoods to be longitudinally tensioned.

Another group of to this extent even more practical hinges is characterized in that the take-apart hinges are continuous in the longitudinal direction along the length of one hood and of one segment of the tunnel base. The advantage is that each tunnel segment and each hood can have a continuous and constant cross-section in the longitudinal direction. The hoods are also secured in the pivoted-up position by the unlifted hinge. The hinge also represents a seal in addition to the track, constituting another advantage.

It is, however, also possible for the continuous hinges to be designed also in the form of a track for sealing purposes or for there to be only one liftable hinge that functions as both a hinge and a seal. This also makes it possible to do without the special arrangement of tracks. Since the take-apart hinges must in any case be larger than the known tracks, the labyrinth gap for sealing purposes is definitely larger, improving the sealing action.

Stops that limit the angle that the hood can pivot around can be positioned between each wall of the hood and segment of tunnel base. These stops indicate to the operator, once one side of the hood has been tilted up, that the prescribed angle has been attained and the pivoting motion is over. This counteracts the risk that the hinge on the other side of the tunnel ca be accidentally separated by tilting the hood too far.

Each edge of the segment of the tunnel base can be covered by a projection in the form of a continuous elongated handle on each wall of the hood. This measure eliminates the need to mount or mold intercepting beads or strips to the hood. This projection, which is an advantage from the aspect of thermodynamics and which at least to some extent covers the side of the tunnel base, can simultaneously function as a manipulating strip, not only facilitating handling but also improving the appearance of the device.

Each hood can have braces on each side that pivot up and dictate the angle. These bars can be mounted either on the hood or on the base. It is also possible for the braces to be separate and to be introduced between the hood and the base once the hood has been pivoted up.

BRIEF DESCRIPTION OF THE DRAWINGS

Preferred embodiments of the invention will now be described in detail with reference to the drawing, wherein.

DESCRIPTION OF THE PREFERRED EMBODIMENTS

Figure 1:
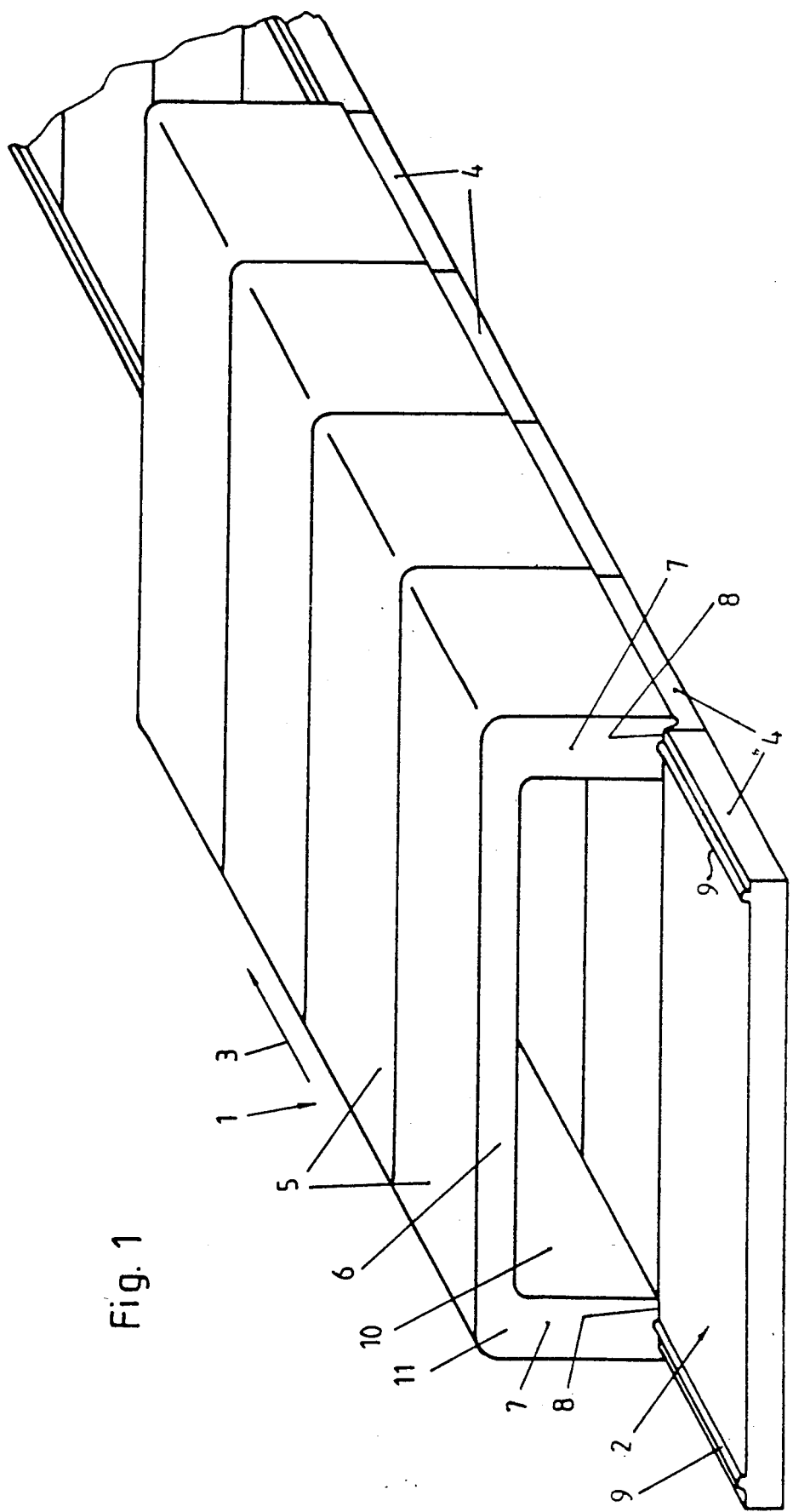
FIG. 1 is a perspective view of a tunnel.

FIG. 1 provides an overview of the essential components of a tunnel 1. The tunnel has a base 2 that can be continuous in the longitudinal direction 3 or composed of several segments 4. Associated with base 2 is a series of hoods 5 distributed along longitudinal direction 3. Each hood 5 has a cross-section essentially in the form of an inverted U, is made from rigid expanded plastic, especially polyurethane, and is positioned symmetrical to a vertical longitudinal midplane. Each hood 5 has an essentially horizontal roof 6 with two walls 7 extending down from it with their free edge 8 resting on base 2 in the vicinity of its edge. Between walls 7 and base 2 in this vicinity is a track 9 in the form, in this embodiment, of a round rib on base 2 and of a matching depression in the free edge 8 of wall 7. The result is a labyrinth-like gap that seals off an interior 10 roofed over by the hood 5 and demarcated by base 2. The faces 11 of hoods 5 perpendicular to longitudinal direction 3 are smooth and are accordingly positioned directly next to each other or one behind another without being covered. In the vicinity of at least one of the two faces 11, each hood 5 has a U-shaped seal 12 (FIG. 2) inserted in a groove. Hoods 5 are compressed or forced together in longitudinal direction 3 by unillustrated tensioning mechanism, ensuring the requisite seal between the hoods.

Figure 2:
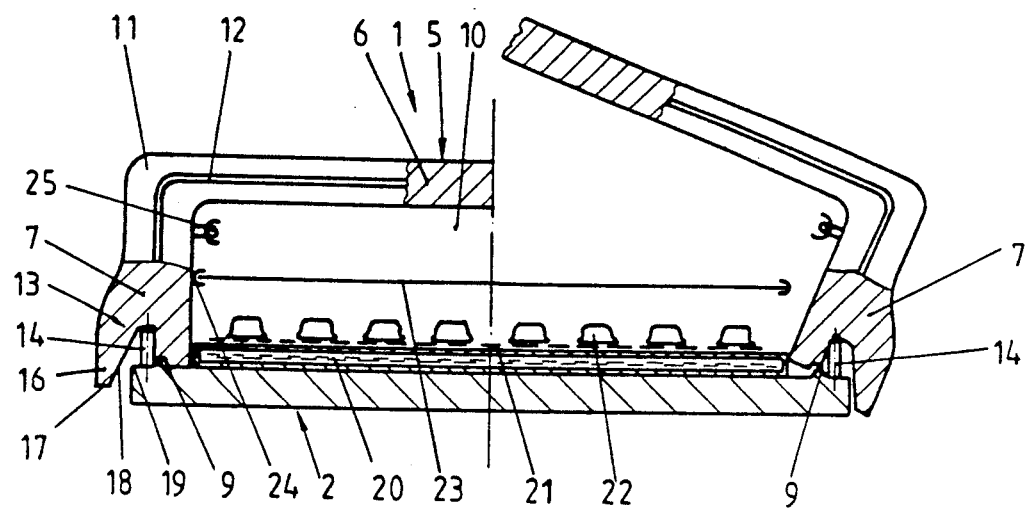
FIG. 2 is a front and partly sectional view into a tunnel, each half showing a different position.
Figure 3:
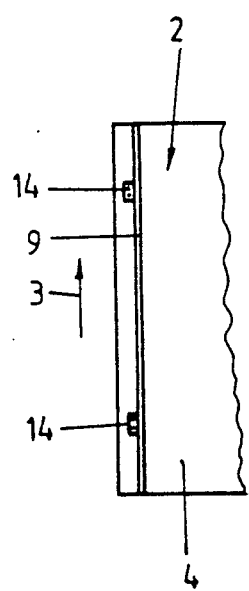
FIG. 3 is a top view of the base of the tunnel illustrated in FIG. 2.
Figure 4:
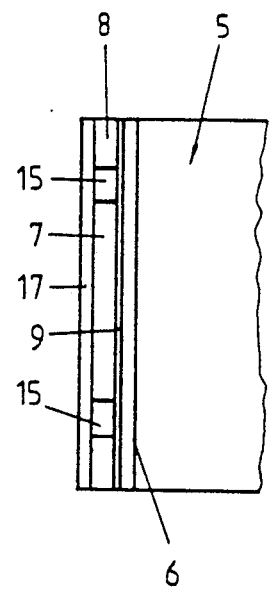
FIG. 4 is a view of the associated hood from below.

The embodiment illustrated in FIGS. 1 through 4 has in addition to track 9, which is not extensive enough vertically to function as a hinge, a take-apart hinge structure on each side of tunnel 1, specifically in the vicinity of both walls 7 or free edges 8 of hood 5. These hinges 13 are local, and each consists of a rib-like elevation 14 in the form of a block of plastic that, as will be evident from FIG. 3 is short in longitudinal direction 3 and of a groove-like depression 15 in the free edge 8 of hood 5. Each hood 5 accordingly has four such hinges 13. FIG. 2 is a section through a hinge 13. It will also be evident that the hinge extends considerably farther vertically than track 9 does. Depressions 15 are also longer in longitudinal direction 3 than elevations 14 are, ensuring the requisite play in longitudinal direction 3. In the vicinity of each wall 7 is an outward extension 16 that covers the side of base 2 and ends in an elongated handle 17 that can be employed, once the tensioning mechanism that acts in longitudinal direction 3 has been disengaged, to tilt each hood 5 up on either side of the tunnel as will be evident from the right-hand side of FIG. 2. Tilting up the hood will lift the two hinges 13 on the left, whereas the hinges on the right will secure hood 5 to base 2, allowing only a pivoting motion. The pivoting motion is limited by a stop 18 inside on extension 16 that operates in conjunction with one edge 19 on base 2, allowing the pivoting motion but preventing it from exceeding a specified angle.

As will be evident from FIG. 2, the interior 10 of tunnel 1 can be built and divided up very differently. One example is provided here. Mounted on base 2 is a channel 20 that has cold water flowing through it. Mounted over water channel 20 is a conveyor belt 21 that moves in longitudinal direction 3 through interior 10. Products 22, chocolate bars for example, are distributed over conveyor belt 21. A metal sheet 23 with a seal 24 at the side can divide the interior 10 above products 22 into two separate compartments that convey air in accordance with the design and application of tunnel 1. Metal sheet 23 can either be mounted on a bearing on base 2 or anchored in hood 5. In the former case it is possible to mount braces 25 at each side on wall 7 in interior 10 that can be swung up once hood 5 has been tilted into position to stabilize it, ensuring access to interior 10 for purposes of cleaning and inspection. Take-apart hinges 13 also make it possible to secure each hood 5 by the elongated handle 17 on each side and lift it. In this way hood 5 can be completely removed, allowing even more complete access to interior 10, even above metal sheet 23 for example. The design of the local hinges 13 can, unless elevations 14 are directly molded in when segments 4 are manufactured, necessitate a certain amount of securing labor as represented by rivets or similar structures in FIGS. 2 and 4.

Figure 5:
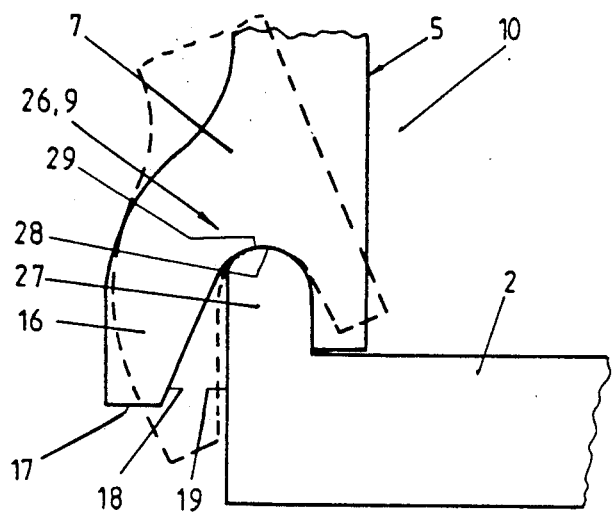
FIG. 5 is a more or less actual-size front view of another embodiment of a take-apart hinge.
Figure 6:
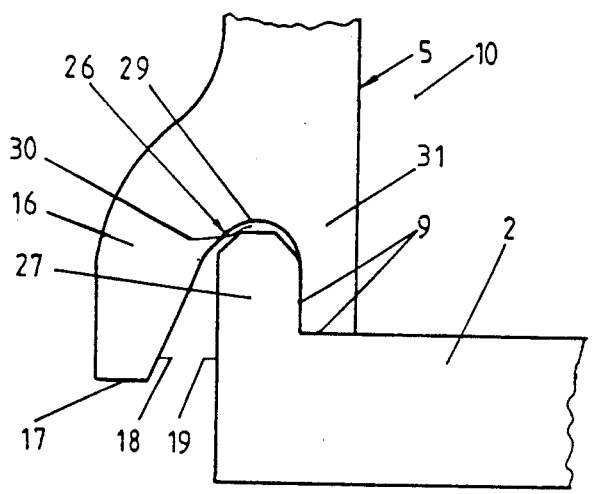
FIG. 6 is a view like that in FIG. 5 of another embodiment.
Figure 7:
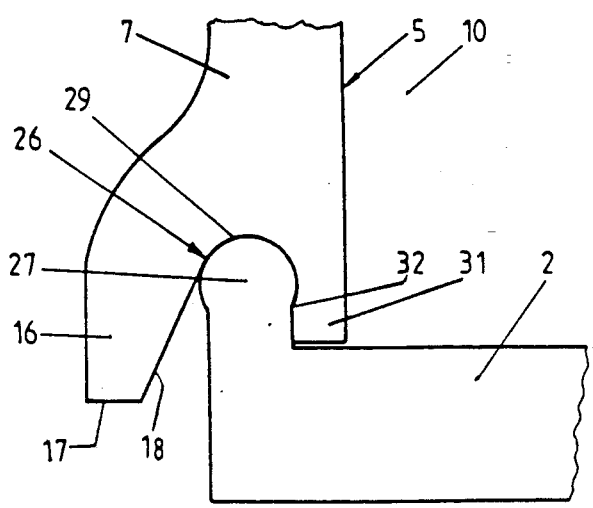
FIG. 7 illustrates a final embodiment of a take-apart hinge.

Even more practical are the embodiments illustrated in FIGS. 5 through 7. These take-apart hinges 26 are continuous over the total length of hood 5 in the longitudinal direction 3 and consist of continuous rib-like elevation 27 on base 2, which is recessed at the top. The side of elevation 27 that faces wall 7 can be rounded as illustrated by the vaulted surface 28. In the free edge 8 of each wall 7 is a groove-like depression 29 that matched the shape of elevation 27 or vaulted surface 28. Elevation 27 and depression 29, which can also basically be reversed with depression 29 in the base and elevation 27 in the hood, together constitute both a take-apart hinge 26 and a track 9, meaning that the sealing gap in hinges 26 simultaneously constitutes a seal for the interior 10 of tunnel 1 in relation to the outside. The broken lines represent the position of a hinge 26 that has not been lifted and that is acting in the capacity of a hinge while the hinge on the other side of hood 5 has been lifted and the hood tilted up.

FIG. 6 illustrates an embodiment wherein take-apart hinge 26 has an elevation 27 that is polygonal in relation to depression 29. Depression 29 can again be round. Since this area 30, however, accommodates air or has play, track 9 is located in the vicinity of an interior elevation 31. The play 30 in the opposite hinge 26 is eliminated only when the hood is pivoted up, and the hinge can then act in the capacity of a hinge.

The surface of the elevation 27 in the embodiment illustrated in FIG. 7 has a circular curvature that 16 slightly more than 180° at least on the side facing extends slightly more than 180° at least on the side facing interior 10, creating at that point a slight undercut 32 for the wall 7 of hood 5 snap into once the hood has been lowered back onto base 2. It will be evident that undercut 32 is very slight and is positioned only within the limits dictated by the elasticity of the material of hood 5 and base 2. Hinge 26 can then be lifted only once a certain small threshold of force has been overcome. This design also promotes the regular hinge function. Both the track and the hinge functions are here again combined into one component.

I claim:

1. A tunnel for cooling, heating, or drying food products, particularly for confectionery industries, comprising: a base having a plurality of adjacent segments; a series of self-supporting hoods of rigid expanded plastic and having a cross-section in form of an inverted U; tracks between edges of said base and walls of said hoods to form a seal; a belt for conveying products longitudinally through the interior of said tunnel; and take-apart hinges positioned between said edges of said base and the walls of said hoods on each side of the tunnel.

2. A tunnel as defined in claim 1, wherein said take-apart hinges comprise a rib-shaped elevation on said base for one-half of said hinges, and a groove-shaped depression on said walls of said hoods for the other half of said hinges.

3. A tunnel as defined in claim 2, wherein said elevation and said depression are integral parts of segments of said base and said hoods by being molded into said base and said hoods.

4. A tunnel as defined in claim 1, wherein at least two take-apart hinges are locally positioned and spaced from each other in a longitudinal direction between said segment of said base and every hood on each side of said tunnel.

5. A tunnel as defined in claim 4, wherein said at least two take-apart hinges have play in said longitudinal direction.

6. A tunnel as defined in claim 1, wherein said hoods have a length dimension, said take-apart hinges being continuous in a longitudinal direction along said length of one hood and of one segment of said base.

7. A tunnel as defined in claim 6, wherein said take-apart hinges comprise also a track for providing sealing means.

8. A tunnel as defined in claim 4, including stops positioned between each wall of said hoods and each segment of said base, said hoods being pivotable through an angle limited by said stops.

9. A tunnel as defined in claim 4, wherein each of said edges of said segments is covered by a projection in form of a continuously elongated handle on each wall of the hoods.

10. A tunnel as defined in claim 1, wherein each hood has braces on each side, said braces being pivotable upward through a predetermined angle.

* * * * *